(12) United States Patent
Liao et al.

(10) Patent No.: US 11,319,020 B2
(45) Date of Patent: May 3, 2022

(54) DERAILLEUR ASSEMBLY

(71) Applicant: TEKTRO TECHNOLOGY CORPORATION, Changhua County (TW)

(72) Inventors: Bo-Yi Liao, Changhua County (TW); Yu-Ming Huang, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 507 days.

(21) Appl. No.: 16/372,564

(22) Filed: Apr. 2, 2019

(65) Prior Publication Data
US 2019/0300112 A1 Oct. 3, 2019

(30) Foreign Application Priority Data

Apr. 3, 2018 (TW) ................................ 107204483

(51) Int. Cl.
*B62M 9/122* (2010.01)
*B62M 9/125* (2010.01)
*B62M 25/08* (2006.01)

(52) U.S. Cl.
CPC ............ *B62M 9/122* (2013.01); *B62M 9/125* (2013.01); *B62M 25/08* (2013.01)

(58) Field of Classification Search
CPC .... B62M 9/122; B62M 9/1242; B62M 25/08; B62M 9/124

USPC ...................................................... 474/82, 80
See application file for complete search history.

(56) References Cited

U.S. PATENT DOCUMENTS

| | | | | |
|---|---|---|---|---|
| 3,919,891 A * | 11/1975 | Stuhlmuller | ........... | B62M 25/08 474/70 |
| 5,480,356 A * | 1/1996 | Campagnolo | .......... | B62M 9/122 280/238 |
| 6,162,140 A * | 12/2000 | Fukuda | .................. | B62M 9/122 474/70 |
| 6,623,389 B1 * | 9/2003 | Campagnolo | .......... | B62M 9/122 474/70 |
| 6,676,549 B1 * | 1/2004 | Fukuda | .................. | B62M 9/122 474/102 |
| 7,001,294 B2 * | 2/2006 | Fukuda | .................. | B62M 9/122 474/102 |
| 7,467,567 B2 * | 12/2008 | Fukuda | .................. | B62M 9/122 474/80 |

(Continued)

*Primary Examiner* — Henry Y Liu
(74) *Attorney, Agent, or Firm* — Locke Lord LLP; Tim Tingkang Xia, Esq.

(57) ABSTRACT

The disclosure relates to a derailleur assembly including a connecting member, a power module, a linkage member, and a driving module. The power module includes a base body and a battery assembly, wherein the battery assembly is disposed on the base body. The linkage member is pivotably disposed on the base body via a first pivot shaft, and the linkage member is pivotably disposed on the connecting member via a second pivot shaft. The driving module includes a casing and a motor, wherein the casing is pivotably disposed on the base body via a third pivot shaft, the casing is pivotably disposed on the connecting member via a fourth pivot shaft, and the motor is disposed in the casing and is electrically connected to the battery assembly.

10 Claims, 9 Drawing Sheets

(56) References Cited

U.S. PATENT DOCUMENTS

| | | | | |
|---|---|---|---|---|
| 7,704,173 B2* | 4/2010 | Ichida | B62M 9/132 | 474/82 |
| 7,942,768 B2* | 5/2011 | Takamoto | B62M 9/122 | 474/82 |
| 8,002,655 B2* | 8/2011 | Meggiolan | B62M 9/122 | 474/82 |
| 8,137,223 B2* | 3/2012 | Watarai | B62M 9/126 | 474/110 |
| 8,870,693 B2* | 10/2014 | Shahana | B62M 9/121 | 474/80 |
| 8,882,618 B2* | 11/2014 | Yamaguchi | B62M 9/122 | 474/82 |
| 8,900,078 B2* | 12/2014 | Yamaguchi | B62M 9/122 | 474/80 |
| 8,974,331 B2* | 3/2015 | Yamaguchi | B62M 9/122 | 474/82 |
| 9,394,030 B2* | 7/2016 | Shipman | B62M 9/122 | |
| 2003/0207732 A1* | 11/2003 | Fukuda | B62M 25/08 | 474/80 |
| 2004/0014541 A1* | 1/2004 | Dal Pra | B62M 9/1244 | 474/70 |
| 2004/0102269 A1* | 5/2004 | Fukuda | B62M 9/122 | 474/82 |
| 2004/0102270 A1* | 5/2004 | Fukuda | B62M 9/1248 | 474/82 |
| 2004/0116221 A1* | 6/2004 | Fukuda | B62M 9/1244 | 474/82 |
| 2004/0138017 A1* | 7/2004 | Kitamura | B62M 9/128 | 474/82 |
| 2005/0187050 A1* | 8/2005 | Fukuda | B62M 9/122 | 474/80 |
| 2005/0199083 A1* | 9/2005 | Meggiolan | B62M 25/08 | 74/473.12 |
| 2005/0215369 A1* | 9/2005 | Fukuda | B62M 25/08 | 474/82 |
| 2005/0239587 A1* | 10/2005 | Ichida | B62M 9/122 | 474/82 |
| 2006/0100045 A1* | 5/2006 | Fukuda | B62M 9/122 | 474/70 |
| 2006/0105869 A1* | 5/2006 | Fukuda | B62M 9/125 | 474/80 |
| 2006/0183584 A1* | 8/2006 | Fukuda | B62M 25/08 | 474/70 |
| 2007/0173360 A1* | 7/2007 | Shahana | B62M 9/1242 | 474/82 |
| 2007/0191159 A1* | 8/2007 | Fukuda | B62M 9/1242 | 474/82 |
| 2008/0227572 A1* | 9/2008 | Sakaue | B62M 9/122 | 474/82 |
| 2009/0209375 A1* | 8/2009 | Takamoto | B62M 25/08 | 474/18 |
| 2009/0215561 A1* | 8/2009 | Fukuda | B62M 9/122 | 474/82 |
| 2009/0291789 A1* | 11/2009 | Ishikawa | B62M 9/1248 | 474/82 |
| 2011/0320093 A1* | 12/2011 | Kitamura | B62M 25/08 | 701/51 |
| 2012/0322591 A1* | 12/2012 | Kitamura | B62J 6/06 | 474/80 |
| 2014/0087901 A1* | 3/2014 | Shipman | B62M 9/122 | 474/82 |
| 2014/0378252 A1* | 12/2014 | Carrasco Vergara | B62M 25/08 | 474/82 |
| 2015/0111675 A1* | 4/2015 | Shipman | B62M 9/122 | 474/82 |
| 2016/0107723 A1* | 4/2016 | Tsai | B62M 9/122 | 474/69 |
| 2016/0152301 A1* | 6/2016 | Bortoli | B62M 9/124 | 474/82 |
| 2017/0066501 A1* | 3/2017 | Hilgenberg | B62M 9/122 | |
| 2018/0244345 A1* | 8/2018 | Yamaguchi | B62M 9/122 | |
| 2018/0354586 A1* | 12/2018 | Komatsu | B62M 25/08 | |
| 2019/0100279 A1* | 4/2019 | Brown | B62M 9/124 | |
| 2019/0300092 A1* | 10/2019 | Masuda | B62M 25/08 | |

* cited by examiner

DERAILLEUR ASSEMBLY

CROSS-REFERENCE TO RELATED APPLICATIONS

This non-provisional application claims priority under 35 U.S.C. § 119(a) on Patent Application No(s). No(s). 107204483 filed in Taiwan, R.O.C. on Apr. 3, 2018, the entire contents of which are hereby incorporated by reference.

TECHNICAL FIELD

The disclosure relates to a derailleur assembly, more particularly to a derailleur assembly with a power module and driving module.

BACKGROUND

Bicycle industry gets a fast development in recent years, more and more people use the bicycle as a form of transportation and use the bicycle to race. The bicycle is often equipped with a rear derailleur that can shift the chain onto a different sized sprocket according to road condition. In addition, the electric derailleur is an increasingly popular choice due to more precise shifting and instant feedback compared to the mechanical derailleur.

The electric derailleur has to be cooperated with a battery, but the battery is conventionally disposed on or accommodated in the bicycle frame. However, disposing the battery on the bicycle frame would negatively affect the appearance of the bicycle, and the cable connected between the battery and the derailleur is arranged along the bicycle frame so that the cable is easily pulled or tangled with external object or damaged due to dust or moisture in the air. And disposing the battery inside the bicycle frame is very limited by the internal space of the bicycle frame, such that the manufacture of which is complicated and not cost-effective. Also, the above ways of disposing the battery requires a longer cable, and which will deteriorate the electricity transmission. Therefore, the above problem is an important issue to be solved in the field.

SUMMARY

One embodiment of the disclosure provides a derailleur assembly including a connecting member, a power module, a linkage member, and a driving module. The power module includes a base body and a battery assembly, wherein the battery assembly is disposed on the base body. The linkage member is pivotably disposed on the base body via a first pivot shaft, and the linkage member is pivotably disposed on the connecting member via a second pivot shaft. The driving module includes a casing and a motor, wherein the casing is pivotably disposed on the base body via a third pivot shaft, the casing is pivotably disposed on the connecting member via a fourth pivot shaft, and the motor is disposed in the casing and is electrically connected to the battery assembly.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Figure 1:
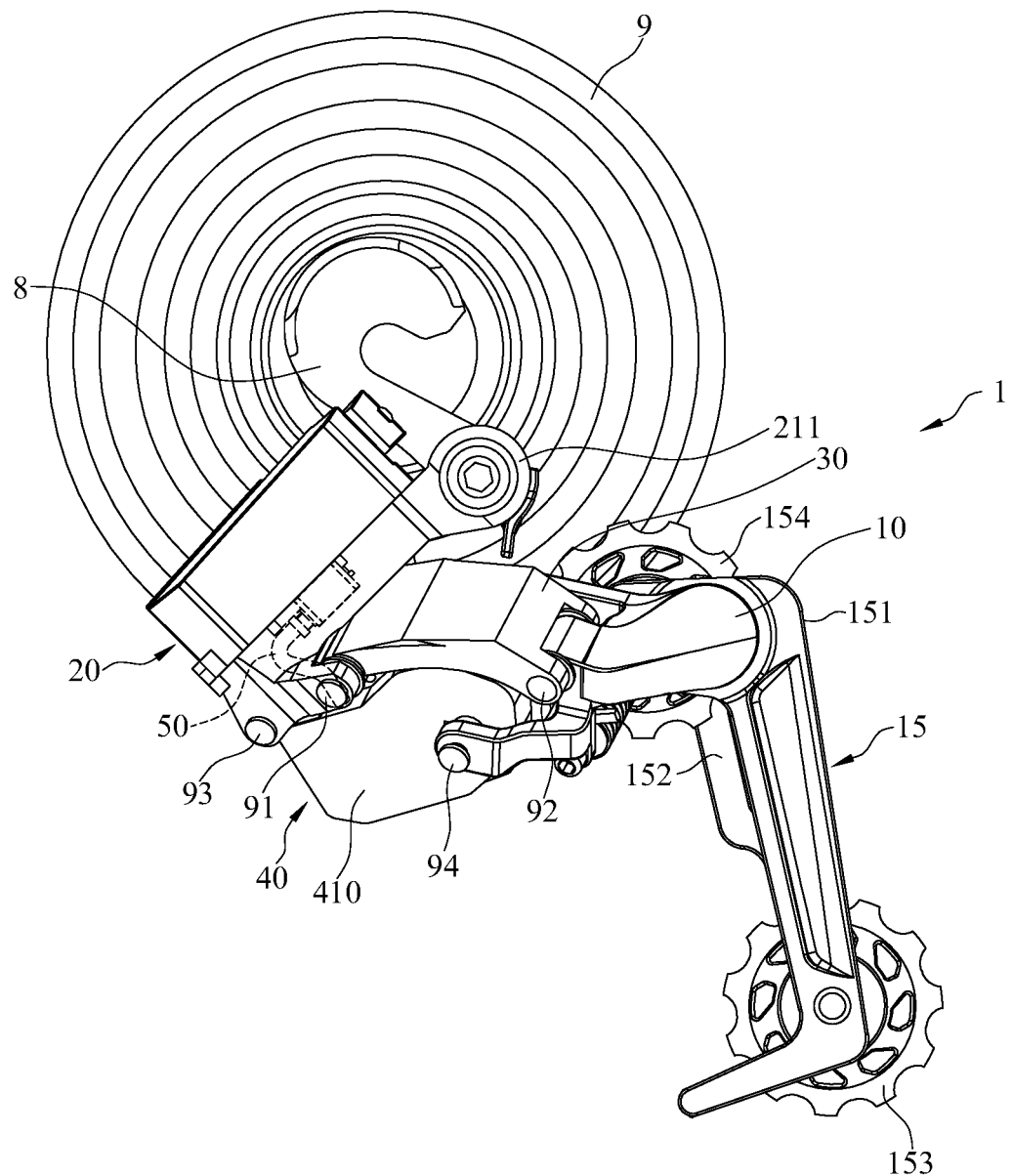
FIG. 1 is a perspective view of a derailleur assembly, frame, and sprockets according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known main structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure. Furthermore, in order to simplify the drawings, some conventional structures and components are drawn in a simplified manner to keep the drawings clean.

Further, the following embodiments are disclosed by the figures, and some practical details are described in the following paragraphs, but the present disclosure is not limited thereto. Furthermore, for the purpose of illustration, some of the structures and components in the figures are simplified, and wires, lines or buses are omitted in some of the figures. And the size, ratio, and angle of the components in the drawings of the present disclosure may be exaggerated for illustrative purposes, but the present disclosure is not limited thereto, and various modifications are allowed and can be made according to the following disclosure as long as it does not depart from the spirit of the present disclosure. Note that the actual size and designs of the product manufactured based on the present disclosure may also be modified according to any actual requirements.

Further, the terms, such as "end", "portion", "part", "area" and the like may be used in the following to describe specific components and structures or specific features thereon or therebetween but are not intended to limit these components and structures. In the following, it may use terms, such as "substantially", "approximately" or "about"; when these terms are used in combination with size, concentration, temperature or other physical or chemical properties or characteristics, they are used to express that, the deviation existing in the upper and/or lower limits of the range of these properties or characteristics or the acceptable tolerances caused by the manufacturing tolerances or analysis process, would still able to achieve the desired effect.

Furthermore, unless otherwise defined, all the terms used in the disclosure, including technical and scientific terms, have their ordinary meanings that can be understood by those skilled in the art. Moreover, the definitions of the above terms are to be interpreted as being consistent with the technical fields related to the disclosure. Unless specifically defined, these terms are not to be construed as too idealistic or formal meanings. The terms of the components in the disclosure are sometimes referred to in a more concise manner, depending on the requirements of the description, and should be understood by the reader.

Figure 2:
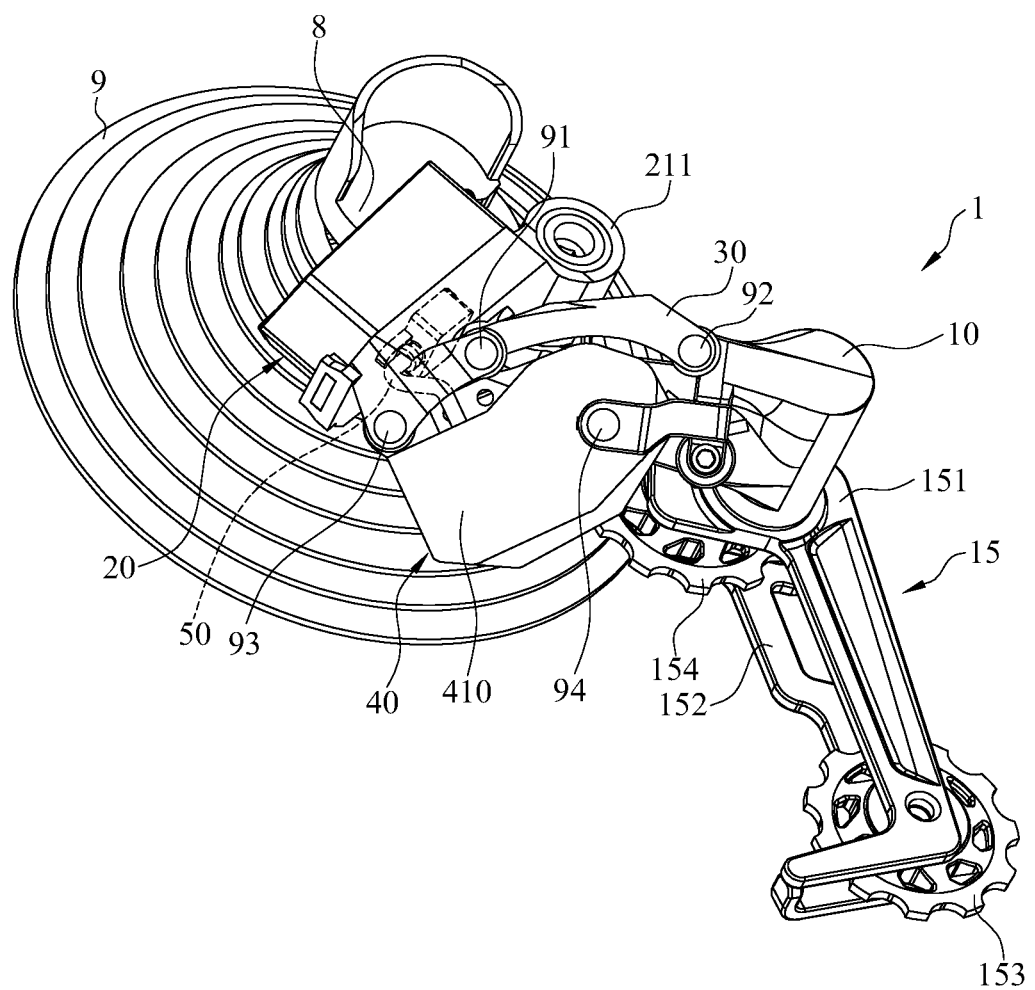
FIG. 2 is another perspective view of FIG. 1.
Figure 3:
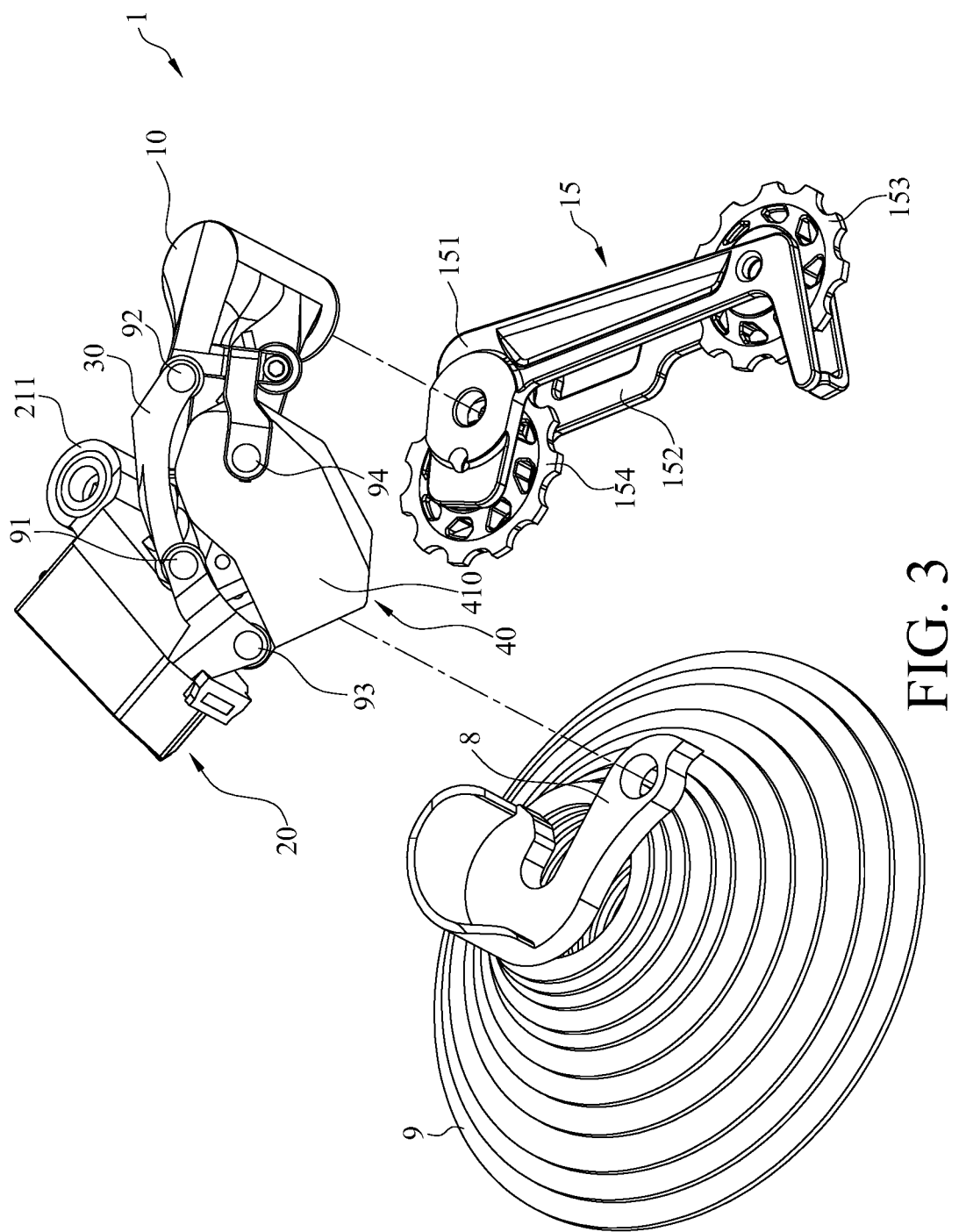
FIG. 3 is an exploded view of FIG. 2.
Figure 4:
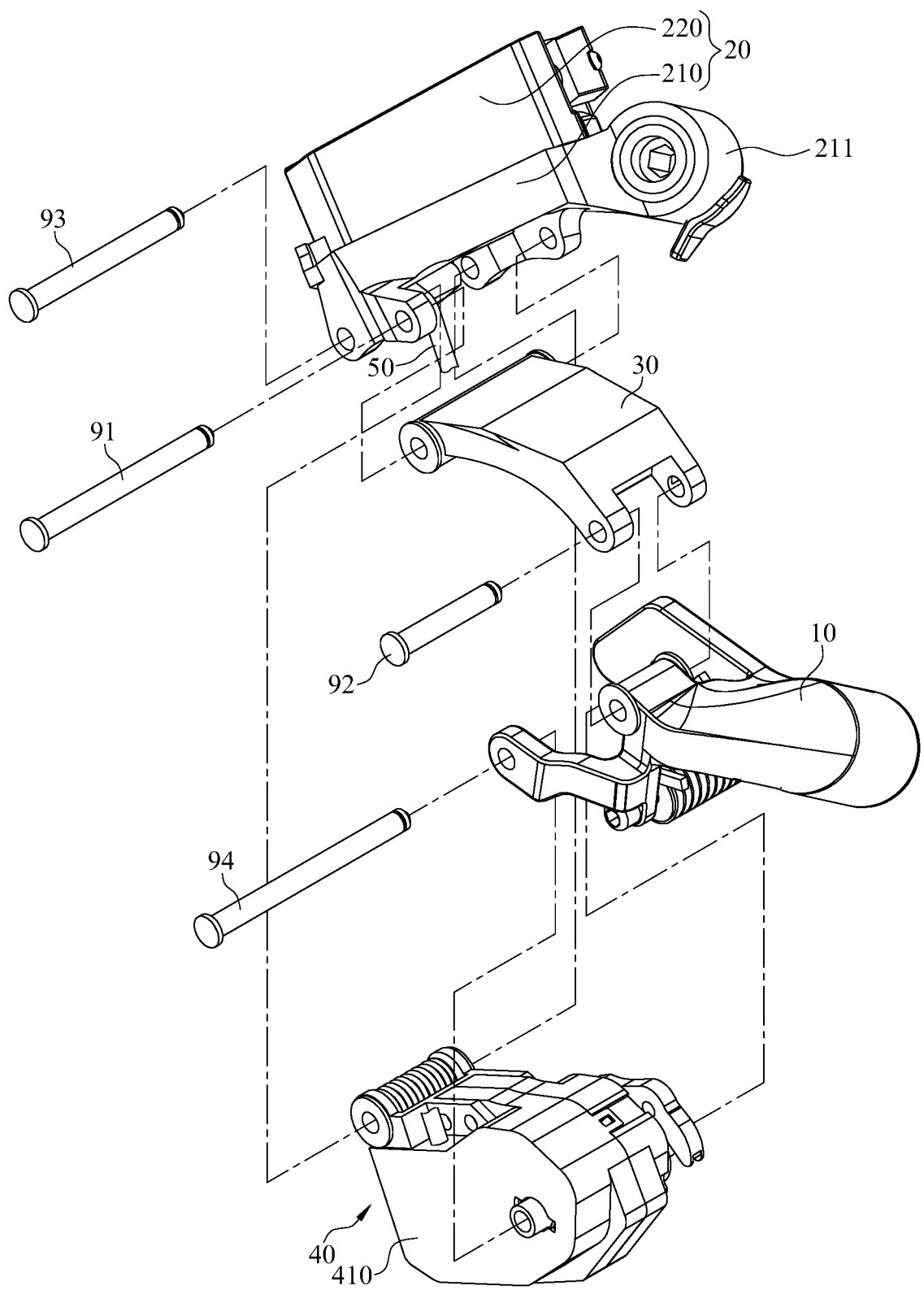
FIGS. 4 and 5 are exploded view of the derailleur assembly of the first embodiment.
Figure 5:
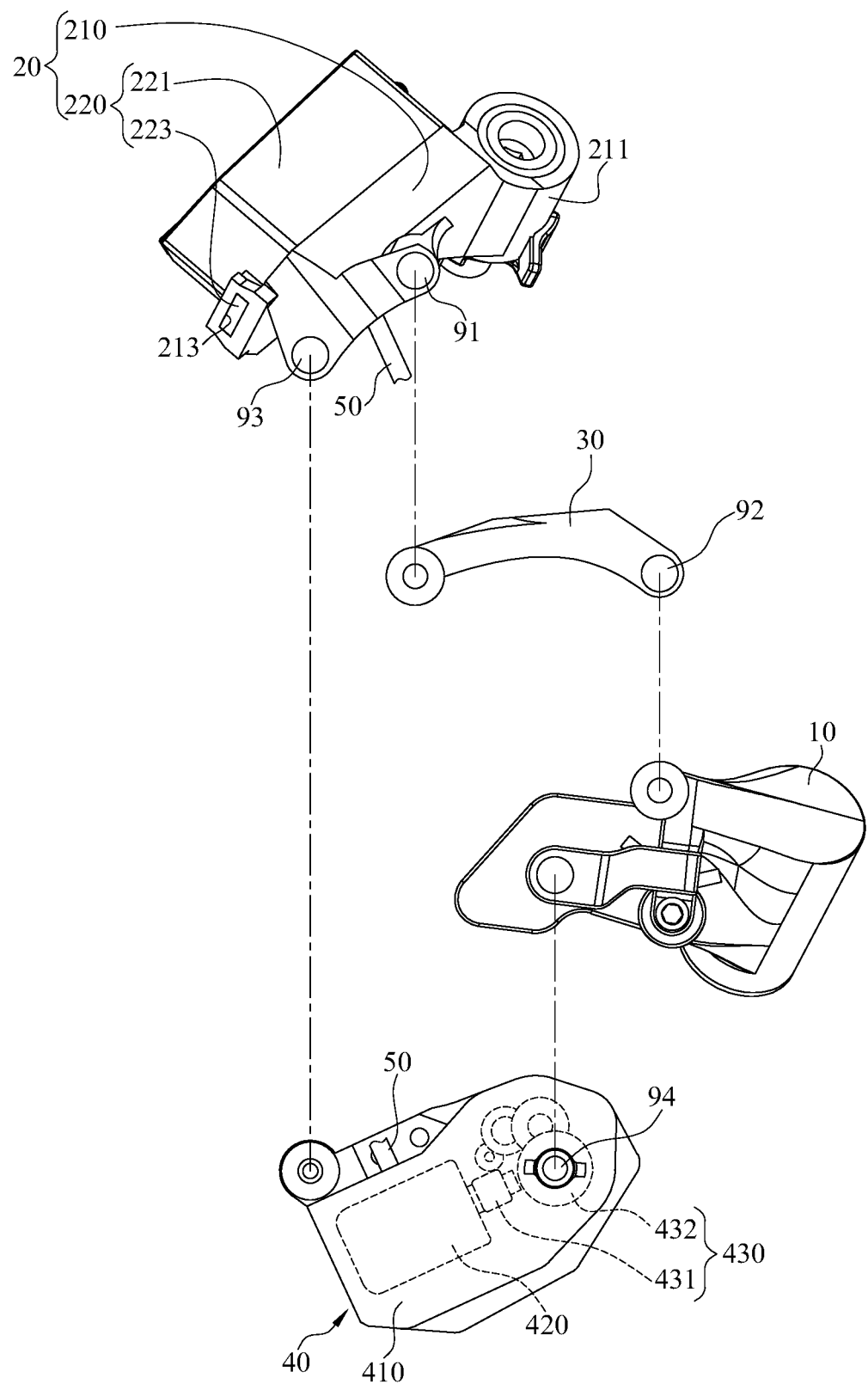

Please refer to FIG. 1 to FIG. 5, FIG. 1 is a perspective view of a derailleur assembly, frame, and sprockets according to a first embodiment of the disclosure, FIG. 2 is another perspective view of FIG. 1, FIG. 3 is an exploded view of FIG. 2, and FIGS. 4 and 5 are exploded view of the derailleur assembly of the first embodiment.

The embodiment provides a derailleur assembly 1, that is configured to be disposed on a frame 8 and located near a group of sprockets 9 and is able to selectively shift a bicycle chain (not shown) from one sprocket 9 to another through a chain guide 15. The frame 8 can be considered as the bicycle frame or part of the bicycle frame, and the sprockets 9 are installed on the bicycle wheel (not shown) and are wheels with teeth and in different diameters. However, the disclosure is not limited by the configuration of the frame 8 and the sprockets 9.

The derailleur assembly 1 includes a connecting member 10, a chain guide 15, a power module 20, a linkage member 30, a driving module 40 and a cable 50.

The chain guide 15 is fixed to the connecting member 10 and is configured to guide the bicycle chain. The chain guide 15 includes a first chain guide plate 151, a second chain guide plate 152, a first guide pulley 153, and a second guide pulley 154. The first guide pulley 153 and the second guide pulley 154 are pivotably disposed on and located between the first chain guide plate 151 and the second chain guide plate 152. The first chain guide plate 151 is fixed to the connecting member 10. The second guide pulley 154 is located closer to the connecting member 10 than the first guide pulley 153.

The power module 20 can provide electricity to the driving module 40. The power module 20 includes a base body 210 and a battery assembly 220. The base body 210 has a mounting part 211 configured to be pivotably mounted on the frame 8.

The battery assembly 220 is disposed on the base body 210 and it will be described in detail later.

The linkage member 30 is pivotably disposed on the base body 210 of the power module 20 and the connecting member 10 respectively via a first pivot shaft 91 and a second pivot shaft 92.

The driving module 40 includes a casing 410, a motor 420, and a transmission mechanism 430. The casing 410 is pivotably disposed on another part of the base body 210 of the power module 20 and another part of the connecting member 10 respectively via a third pivot shaft 93 and a fourth pivot shaft 94, such that the connecting member 10, the base body 210 of the power module 20, the linkage member 30, and the casing 410 of the driving module 40 together form a four-linkage mechanism. The four-linkage mechanism can be simply called 'linkage mechanism' below. In addition, as shown in FIG. 2, the connecting member 10 is considered as a movable member of the linkage mechanism, and the base body 210 of the power module 20 is considered as a base member of the linkage mechanism. The driving module 40 is located between the sprockets 9 and the linkage member 30, and the driving module 40 is located closer to the sprockets 9 (or the frame 8) than the linkage member 30, such that the casing 410 of the driving module 40 can be considered as an inner linkage member of the linkage mechanism, and the base body 210 of the power module 20 is considered as the base member of the linkage mechanism. As such, the amount of the components of the derailleur assembly 1 is reduced and thus making the derailleur assembly 1 lightweight.

The motor 420 and the transmission mechanism 430 of the driving module 40 are both disposed in the casing 410. The transmission mechanism 430 includes a worm screw 431 and a worm wheel 432. The worm screw 431 is disposed on the motor 420. The worm wheel 432 is disposed on the fourth pivot shaft 94. The worm screw 431 is engaged with the worm wheel 432 in order to rotate the worm wheel 432.

The transmission mechanism 430 is able to reduce the speed by using the gear ratio of the worm screw 431 to the worm wheel 432. In addition, the transmission mechanism 430 is able to be self-locked by adjusting the angles of the worm screw 431 and/or worm wheel 432; that is, the worm screw 431 is able to rotate the worm wheel 432, but the worm wheel 432 is not allowed to pivot the worm screw 431. As a result, as the fourth pivot shaft 94 is unwantedly pivoted to force the worm wheel 432 to pivot, the worm wheel 432 will not successfully move the motor 420.

Further, even the worm screw 431 is pivoted by the worm wheel 432, the reduced speed feature of the transmission mechanism 430 is able to suppress the movement of the worm screw 431 so as to prevent the motor 420 from being damaged.

Therefore, the motor 420 is able to pivot the fourth pivot shaft 94 through the transmission mechanism 430. The fourth pivot shaft 94 is fixed to the connecting member 10. But the transmission mechanism 430 is optional; for example, in some other embodiments, the driving module may not have the transmission mechanism 430, in such a case, the motor 420 may be directly connected to the fourth pivot shaft 94 for driving the fourth pivot shaft 94.

In addition, the casing 410 is easier to be detached than the base body 210 and the connecting member 10 (movable member) since the casing 410 is the inner linkage member. And the driving module 40 is allowed to be individually detached from the derailleur assembly 1 since the base body 210 and the connecting member 10 (movable member) are fixed in place via both the linkage member 30 and the casing 410. In detail, the driving module 40 can be detached by removing the third pivot shaft 93 and the fourth pivot shaft 94, and the removal of which is easy and time-saving. In contrast, to the conventional rear derailleur with motor assembled on the base member or movable member, the removal of the motor is more complicated and troublesome.

Figure 6:
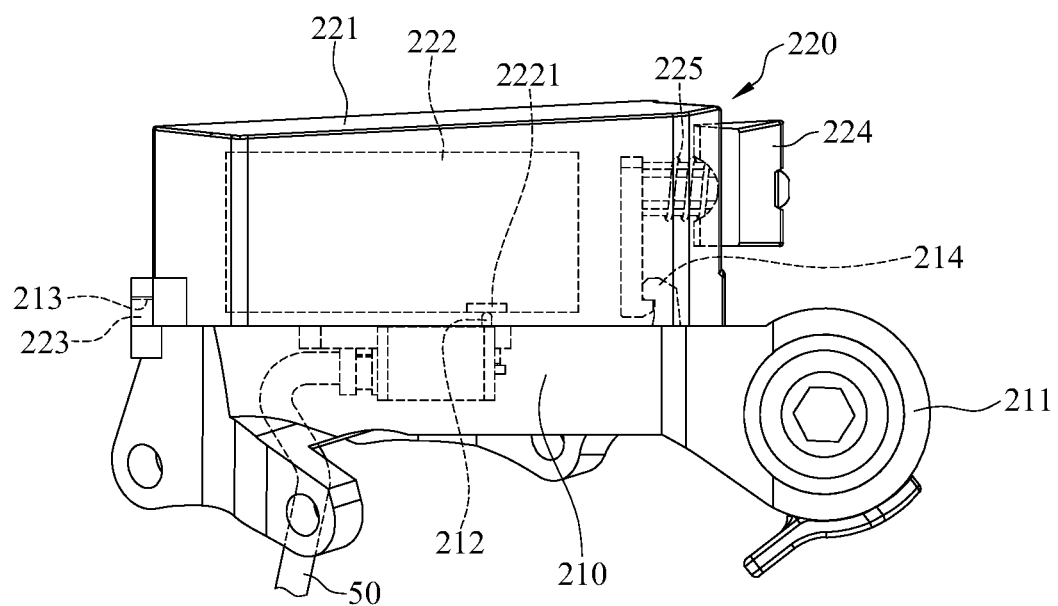
FIG. 6 is an enlarged view of a power module and cable in FIG. 1.

Then, please refer to FIG. 6 to see an enlarged view of a power module and cable in FIG. 1.

The base body 210 of the power module 20 further has a first electrical contact portion 212, a slot 213, and a first hook 214 opposite the slot 213. The battery assembly 220 includes a battery casing 221, a battery 222, a protrusion 223, a second hook 224, and a spring 225. The battery casing 221 is disposed on a side of the base body 210 facing away from the connecting member 10. The battery 222 is accommodated in the battery casing 221, and the battery 222 has a second electrical contact portion 2221. The battery 222 is electrically connected to the first electrical contact portion 212 of the base body 210 via the second electrical contact portion 2221. The protrusion 223 protrudes from the battery casing 221 and is detachably inserted into the slot 213 of the base body 210. The second hook 224 is disposed on a side of the battery casing 221 opposite the protrusion 223, and the second hook 224 is switchable between an engaged position and a disengaged position. When the second hook 224 is in the engaged position, the second hook 224 is engaged with the first hook 214 so as to fix the battery casing 221 to the base body 210. When the second hook 224 is in the disengaged position, the second hook 224 is disengaged from the first hook 214 so that the protrusion 223 is allowed to be removed from the slot 213 and the battery casing 221 is allowed to be detached from the base body 210. Two opposite ends of the spring 225 are respectively connected to the second hook 224 and the battery casing 221 so that the spring 225 constantly forces the second hook 224 to move toward the engaged position.

Due to the above engagement structures between the base body 210 and the battery assembly 220, the battery casing 221 is detachably mounted on the base body 210 and thus making the installation and removal of the battery 222 easier. In detail, the user or maintenance personnel only needs to push the second hook 224 toward the battery casing 221 to disengage the second hook 224 from the first hook 214, the battery casing 221 is then able to be removed and the user is then allowed to reach the battery 222. But the configurations of the second hook 224 and the first hook 214 are not restricted, any engagement structure that enables the battery casing 221 to be detachably fixed on the base body 210 falls within the scope of the disclosure. Further, the disclosure is not limited by how the battery casing 221 is connected to the base body 210; for example, in some other embodiments, the battery casing may be not detachably fixed on the base body.

One end of the cable 50 is electrically connected to the first electrical contact portion 212 of the base body 210, and another end of the cable 50 is electrically connected to the motor 420.

As discussed above, as the motor 420 of the driving module 40 receives electric signal, the battery 222 provides electricity to activate the motor 420 through the cable 50, and then the motor 420 starts to pivot the fourth pivot shaft 94 through the worm screw 431 and the worm wheel 432, such that the connecting member 10 fixed on the fourth pivot shaft 94 is forced to pivot relative to the casing 410. Meanwhile, the chain guide 15 fixed on the connecting member 10 is moved relative to the power module 20 and thus starting to shift the bicycle chain from one sprocket 9 to another.

In this embodiment, the worm wheel 432 of the transmission mechanism 430 is disposed on the fourth pivot shaft 94 and is able to pivot the fourth pivot shaft 94 as being driven by the motor 420, but the disclosure is not limited thereto. In some other embodiments, the worm wheel may be disposed on the third pivot shaft, and the worm wheel may drive the third pivot shaft to pivot when the motor pivots the worm screw. As such, the base body of the power module fixed to the third pivot shaft is forced to pivot relative to the casing of the driving module; that is, due to the four-linkage mechanism, the connecting member is movable relative to the power module.

In this embodiment, the connecting member 10 is considered as the movable member of the linkage mechanism for the installation of the chain guide 15, and the base body 210 of the power module 20 is pivotably disposed on the frame 8 and is considered as the base member of the linkage mechanisms, but the disclosure is not limited thereto. In some other embodiments, the connecting member may be the base member of the linkage mechanism, and the base body of the power module may be the movable member of the linkage mechanism.

Figure 7:
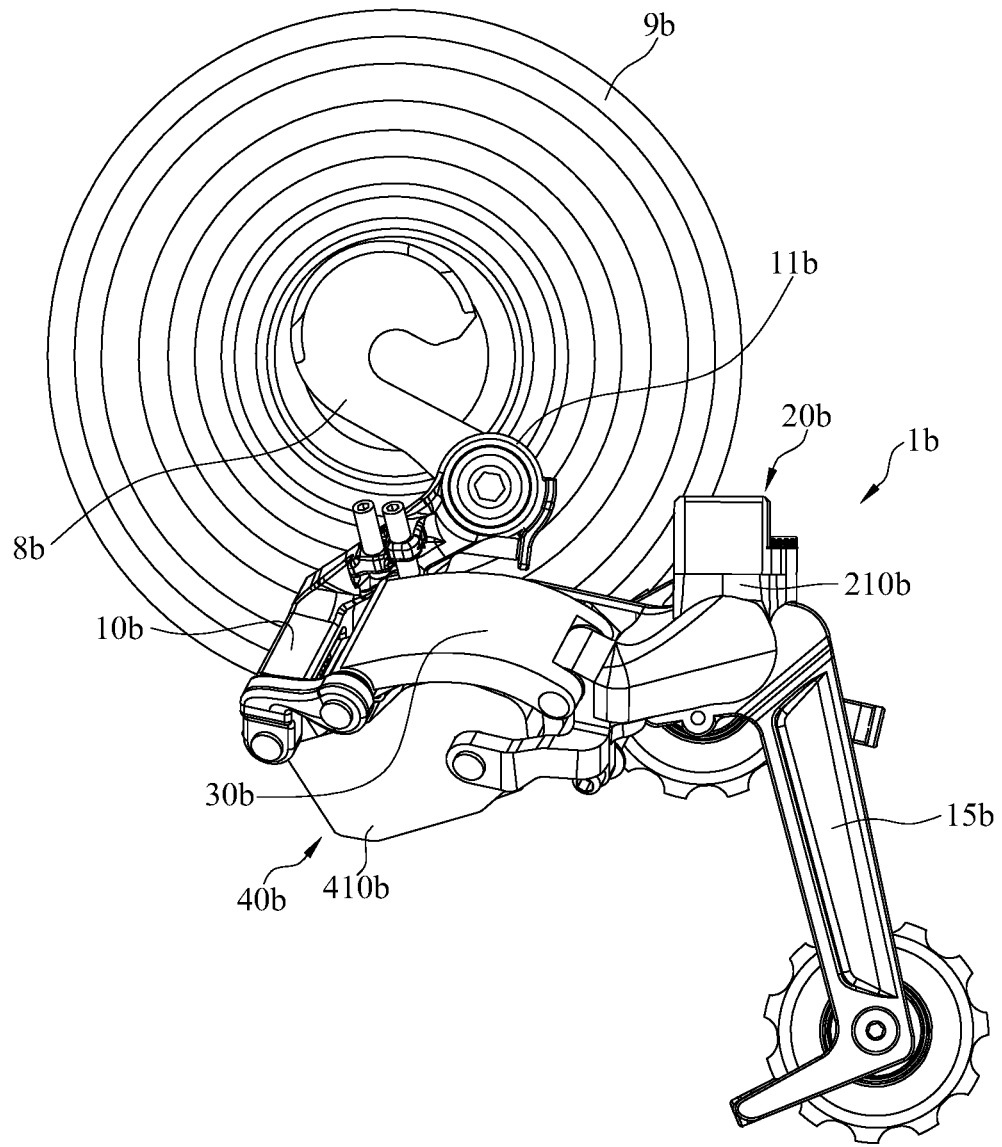
FIG. 7 a perspective view of a derailleur assembly, frame, and sprockets according to a second embodiment of the disclosure.

For example, please refer to FIG. 7, FIG. 7 a perspective view of a derailleur assembly, frame, and sprockets according to a second embodiment of the disclosure.

In this embodiment, a derailleur assembly 1b is similar to the derailleur assembly 1 of the first embodiment, a casing 410b of a driving module 40b is also considered as the inner linkage member of the linkage mechanism, and a linkage member 30b is also considered as the outer linkage member of the linkage mechanism.

One of the differences is that a connecting member 10b of the derailleur assembly 1b is the base member of the linkage mechanism, and the connecting member 10b has a mounting part 11b pivotably disposed on a frame 8b. Another difference is that a base body 210b of a power module 20b is the movable member of the linkage mechanism for the installation of a chain guide 15b.

Further, in the first embodiment, the casing 410 of the driving module 40 is considered as the inner linkage member of the linkage mechanism, and the linkage member 30 is considered as the outer linkage member of the linkage mechanism, but the disclosure is not limited thereto. In some other embodiments, the casing of the driving module may be the outer linkage member of the linkage mechanism.

Figure 8:
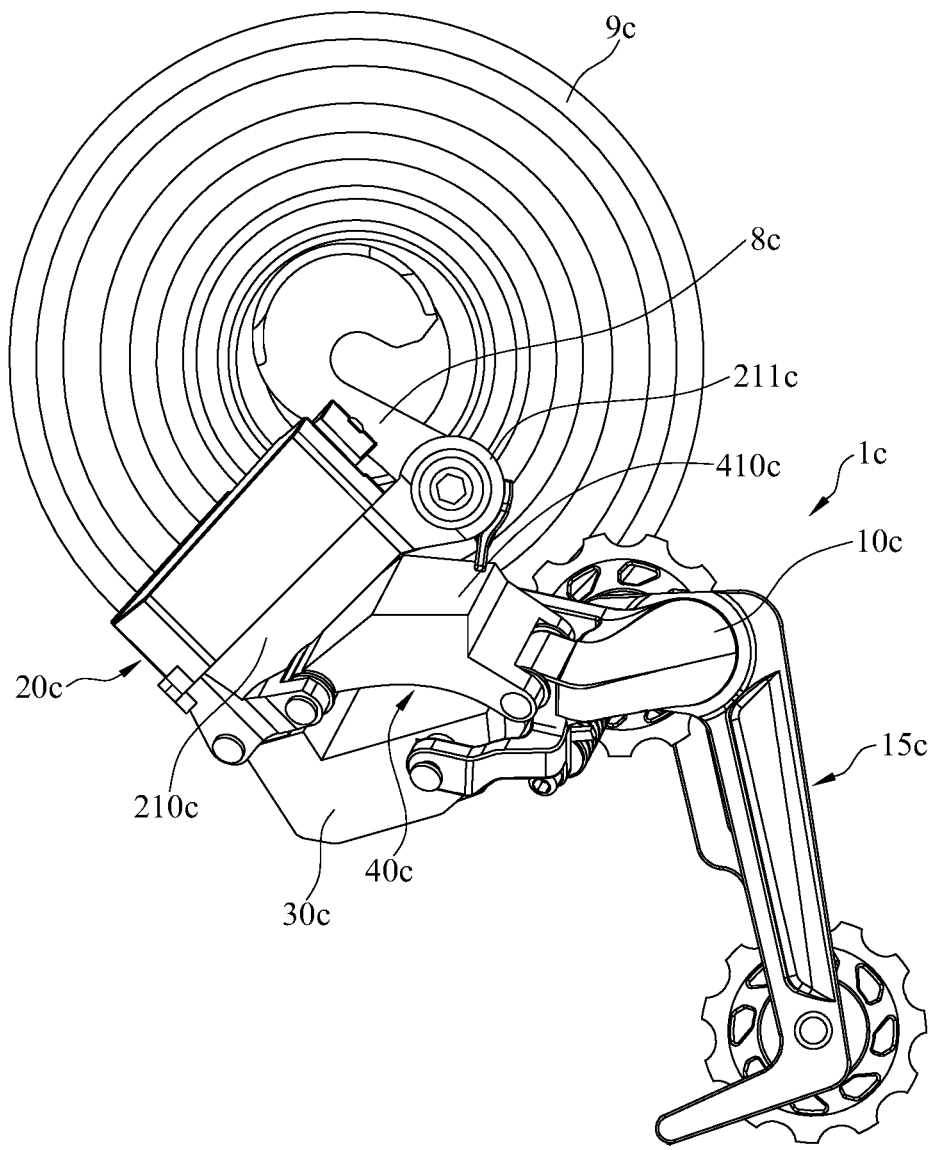
FIG. 8 a perspective view of a derailleur assembly, frame, and sprockets according to a third embodiment of the disclosure.

For example, please refer to FIG. 8, FIG. 8 a perspective view of a derailleur assembly, frame, and sprockets according to a third embodiment of the disclosure.

In this embodiment, a derailleur assembly 1c is similar to the derailleur assembly 1 of the first embodiment, the derailleur assembly 1c has a connecting member 10c that is the movable member of the linkage mechanism for the installation of a chain guide 15c, and a base body 210c of a power module 20c is the base member of the linkage mechanism and has a mounting part 211c pivotably disposed on a frame 8c near a group of sprockets 9c.

In this embodiment, a casing 410c of a driving module 40c of the derailleur assembly 1c is considered as the outer linkage member of the linkage mechanism, and a linkage member 30c is the inner linkage member of the linkage mechanism; that is, the driving module 40c is located further away from the sprockets 9c (or the frame 8c) than the linkage member 30c.

Figure 9:
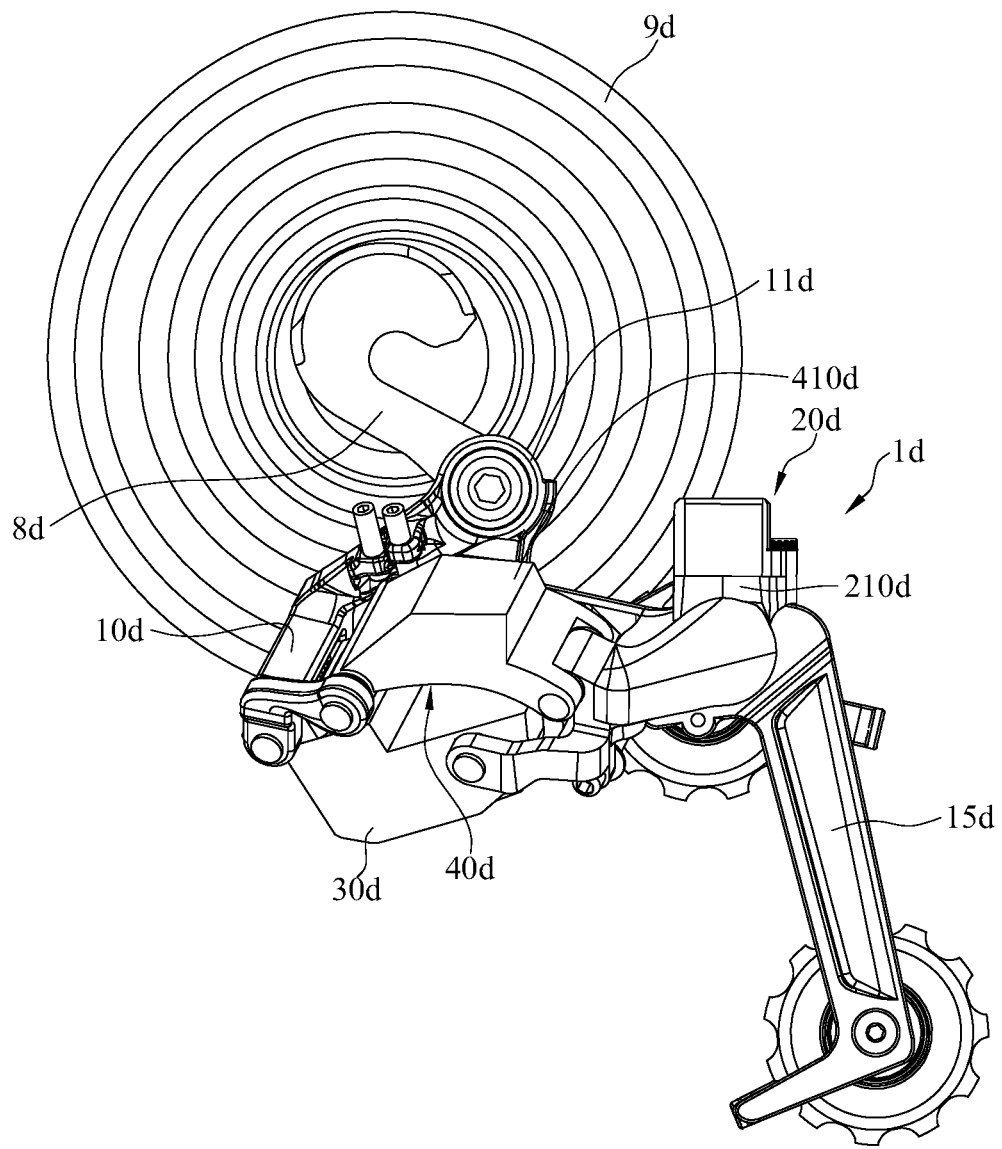
FIG. 9 a perspective view of a derailleur assembly, frame, and sprockets according to a fourth embodiment of the disclosure.

Moreover, please refer to FIG. 9, FIG. 9 a perspective view of a derailleur assembly, frame, and sprockets according to a fourth embodiment of the disclosure.

In this embodiment, a derailleur assembly 1d is similar to the derailleur assembly 1c of the third embodiment, a casing 410d of a driving module 40d of the derailleur assembly 1d is the outer linkage member of the linkage mechanism, and a linkage member 30d is the inner linkage member of the linkage mechanism.

One of the differences is that a connecting member 10d of the derailleur assembly 1d is the base member of the linkage mechanism and has a mounting part 11d pivotably disposed on a frame 8d near a group of sprockets 9d. And another difference is that a base body 210d of a power module 20d is the movable member of the linkage mechanism for the installation of a chain guide 15d.

According to the derailleur assembly, the connecting member, the base body of the power module, the linkage member, and the casing of the driving module together form a four-linkage mechanism, and the casing of the driving module can be the inner linkage member or the outer linkage member of the linkage mechanism, and the base body of the power module can be the base member or the movable member of the linkage mechanism. Therefore, this configuration achieves a reduced amount of components of the derailleur assembly so as to reduce the overall volume of the derailleur assembly, thereby making the derailleur assembly lightweight.

In addition, since the power module is disposed on the derailleur assembly, the distance of electricity transmission is largely reduced and thus decreasing the effect on the electricity transmission and preventing the cable from being accidentally pulled or tangled with external object.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A derailleur assembly, comprising:
a connecting member;
a power module, comprising a base body and a battery assembly, wherein the battery assembly is disposed on the base body;
a linkage member, wherein the linkage member is pivotably disposed on the base body via a first pivot shaft, and the linkage member is pivotably disposed on the connecting member via a second pivot shaft; and
a driving module, comprising a casing and a motor, wherein the casing is pivotably disposed on the base body via a third pivot shaft, the casing is pivotably disposed on the connecting member via a fourth pivot shaft, and the motor is disposed in the casing and is electrically connected to the battery assembly;
wherein the battery assembly further comprises a battery casing and a battery, the battery casing is detachably mounted on the base body, the battery is accommodated in the battery casing and is electrically connected to the motor;
wherein the base body has a first hook, the battery assembly further comprises a second hook and a spring, the second hook is disposed on the battery casing and switchable between an engaged position and a disengaged position; when the second hook is in the engaged position, the second hook is engaged with the first hook; when the second hook is in the disengaged position, the second hook is disengaged from the first hook; two opposite ends of the spring are respectively connected to the second hook and the battery casing so as to constantly force the second hook to move toward the engaged position.

2. The derailleur assembly according to claim 1, further comprising a chain guide, wherein the base body has a mounting part configured to be pivotably disposed on a frame near a plurality of sprockets, the chain guide is fixed on the connecting member; when the mounting part of the base body is dispoed on the frame, the driving module is located between the plurality of sprockets and the linkage member.

3. The derailleur assembly according to claim 1, further comprising a chain guide, wherein the connecting member has a mounting part configured to be pivotably disposed on a frame near a plurality of sprockets, the chain guide is fixed on the base body; when the mounting part of the connecting member is disposed on the frame, the driving module is located between the plurality of sprockets and the linkage member.

4. The derailleur assembly according to claim 1, further comprising a chain guide, wherein the connecting member has a mounting part configured to be pivotably disposed on a frame near a plurality of sprockets, the chain guide is fixed on the base body; when the mounting part of the connecting member is disposed on the frame, the linkage member is located between the plurality of sprockets and the driving module.

5. The derailleur assembly according to claim 1, further comprising a chain guide, wherein the base body has a mounting part configured to be pivotably disposed on a frame near a plurality of sprockets, the chain guide is fixed on the connecting member; when the mounting part of the base body is disposed on the frame, the linkage member is located between the sprockets and the driving module.

6. The derailleur assembly according to claim 1, wherein the battery assembly is located at a side of the base body facing away from the connecting member.

7. The derailleur assembly according to claim 1, further comprising a cable, wherein one end of the cable is electrically connected to the battery assembly, and another end of the cable is electrically connected to the motor.

8. The derailleur assembly according to claim 1, further comprising a cable, wherein the base body has a first electrical contact portion, the battery has a second electrical contact portion, one end of the cable is electrically connected to the first electrical contact portion, another end of the cable is electrically connected to the motor, and the battery is electrically connected to the first electrical contact portion via the second electrical contact portion.

9. The derailleur assembly according to claim 1, wherein the driving module further comprises a transmission mechanism disposed in the casing, the transmission mechanism comprises a worm screw and a worm wheel, the worm screw is disposed on the motor, the worm wheel is disposed on the third pivot shaft or the fourth pivot shaft, the worm screw is engaged with the worm wheel, and the worm screw is configured to pivot the worm wheel.

10. A derailleur assembly, comprising:
a connecting member;
a power module, comprising a base body and a battery assembly, wherein the battery assembly is disposed on the base body;
a linkage member, wherein the linkage member is pivotably disposed on the base body via a first pivot shaft, and the linkage member is pivotably disposed on the connecting member via a second pivot shaft; and
a driving module, comprising a casing and a motor, wherein the casing is pivotably disposed on the base body via a third pivot shaft, the casing is pivotably disposed on the connecting member via a fourth pivot shaft, and the motor is disposed in the casing and is electrically connected to the battery assembly;
wherein the driving module further comprises a transmission mechanism disposed in the casing, the transmission mechanism comprises a worm screw and a worm wheel, the worm screw is disposed on the motor, the worm wheel is disposed on the third pivot shaft or the fourth pivot shaft, the worm screw is engaged with the worm wheel, and the worm screw is configured to pivot the worm wheel.

* * * * *